(12) United States Patent
Max et al.

(10) Patent No.: US 11,455,840 B2
(45) Date of Patent: Sep. 27, 2022

(54) METHOD, DEVICE AND COMPUTER-READABLE STORAGE MEDIUM WITH INSTRUCTIONS FOR PROCESSING DATA IN A MOTOR VEHICLE FOR FORWARDING TO A BACK END

(71) Applicant: Volkswagen Aktiengesellschaft, Wolfsburg (DE)

(72) Inventors: Stephan Max, Gifhorn (DE); Vladislavs Serebro, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 345 days.

(21) Appl. No.: 16/638,913

(22) PCT Filed: Aug. 10, 2018

(86) PCT No.: PCT/EP2018/071738
§ 371 (c)(1),
(2) Date: Feb. 13, 2020

(87) PCT Pub. No.: WO2019/034552
PCT Pub. Date: Feb. 21, 2019

(65) Prior Publication Data
US 2020/0193731 A1   Jun. 18, 2020

(30) Foreign Application Priority Data
Aug. 16, 2017 (DE) ...................... 10 2017 214 293.6

(51) Int. Cl.
G07C 5/00 (2006.01)
B60R 16/023 (2006.01)
(Continued)

(52) U.S. Cl.
CPC .......... *G07C 5/008* (2013.01); *B60R 16/0231* (2013.01); *G01C 21/34* (2013.01);
(Continued)

(58) Field of Classification Search
USPC ........................................................ 701/517
See application file for complete search history.

(56) References Cited

U.S. PATENT DOCUMENTS 7,821,421 B2  10/2010  Tamir et al. .................. 340/901
8,930,063 B2   1/2015  Gandhi et al. ............... 701/31.1
(Continued)

FOREIGN PATENT DOCUMENTS

| DE | 102007035219 A1 | 1/2009 | ............ B60W 30/06 |
| DE | 102008007667 A1 | 6/2009 | ............. G01S 13/10 |

(Continued)

OTHER PUBLICATIONS

German Office Action, Application No. 102017214293.6, 5 pages.
International Search Report and Written Opinion, Application No. PCT/EP2018/071738, 23 pages.

*Primary Examiner* — Tyler D Paige
(74) *Attorney, Agent, or Firm* — Slayden Grubert Beard PLLC (57) ABSTRACT

A method, a device and a computer-readable storage medium with instructions for processing data in a motor vehicle for forwarding to a back end. In a first step, sensor data are detected along a route of the motor vehicle. On the basis of the sensor data, features and context information on the features are then identified within segments of the route. Finally, the features and the context information on the features are combined into a message for the route.

11 Claims, 5 Drawing Sheets

(51) Int. Cl.
    *G01C 21/34*     (2006.01)
    *G01S 15/931*     (2020.01)
    *G08G 1/14*     (2006.01)
    *G01S 7/00*     (2006.01)
    *G06F 5/01*     (2006.01)
    *G08G 1/01*     (2006.01)

(52) U.S. Cl.
    CPC ............ *G01S 15/931* (2013.01); *G08G 1/142* (2013.01); *G01S 2015/935* (2013.01); *G01S 2015/936* (2013.01)

(56) References Cited

U.S. PATENT DOCUMENTS

| | | |
|---|---|---|
| 9,747,791 B2 | 8/2017 | Mayer et al. |
| 9,959,759 B2 | 5/2018 | Schulz |
| 10,235,580 B2 | 3/2019 | Belzner et al. |
| 2006/0106534 A1 | 5/2006 | Kawamata et al. .......... 701/532 |
| 2010/0332078 A1 | 12/2010 | Hering et al. ................. 701/36 |
| 2015/0009047 A1 | 1/2015 | Ashkenazi et al. ........ 340/932.2 |
| 2017/0197615 A1* | 7/2017 | Elie ....................... B60W 30/06 |

FOREIGN PATENT DOCUMENTS

| | | | |
|---|---|---|---|
| DE | 102009021014 A1 | 11/2009 | ............... G08G 1/14 |
| DE | 102011086268 A1 | 5/2013 | ............... B60R 1/10 |
| DE | 102013202377 A1 | 8/2013 | ............... B60R 1/00 |
| DE | 102012218334 A1 | 6/2014 | ............... G08G 1/14 |
| DE | 102015205855 A1 | 10/2016 | ............... G06K 9/62 |
| DE | 102015206457 A1 | 10/2016 | ........... B60W 30/06 |
| DE | 102015207804 A1 | 11/2016 | ........... B60W 40/02 |
| DE | 102017214293 A1 | 2/2019 | ............... B60R 16/02 |
| WO | 2019/034552 A1 | 2/2019 | ............... G08G 1/01 |

* cited by examiner

METHOD, DEVICE AND COMPUTER-READABLE STORAGE MEDIUM WITH INSTRUCTIONS FOR PROCESSING DATA IN A MOTOR VEHICLE FOR FORWARDING TO A BACK END

CROSS-REFERENCE TO RELATED APPLICATIONS

This application claims priority to German Patent Application No. DE 10 2017 214 293.6, filed on Aug. 16, 2017 with the German Patent and Trademark Office. The contents of the aforesaid Patent Application are incorporated herein for all purposes.

TECHNICAL FIELD

The present invention relates to a method, a device and a computer-readable storage medium with instructions for processing data in a motor vehicle for forwarding to a back end. The invention furthermore relates to a motor vehicle in which a method according to the invention, or device according to the invention, is used.

BACKGROUND

Modern motor vehicles frequently have park assists. This can for example be distance sensors in combination with acoustic or visual warnings, or backup cameras. More involved systems detect the space of a potential parking space in order to thereby calculate a potential parking position, or to ascertain whether there is in fact sufficient space for parking. To accomplish this, cameras or ultrasonic sensors are used, for example, that measure the parking space.

Against this backdrop, DE 10 2015 206 457 A1 describes a parking assistance system for a vehicle to detect a parking space in the environment of the vehicle. A sensor unit detects the arrangement and the dimensions of the parking space and the occupied status of the parking space. The sensor unit transfers this data to a computing unit, wherein the computing unit can also be arranged outside of the vehicle. Using map data and/or occupancy information contained in the digital map data, the computing unit fuses the data on the parking space detected by the sensor unit.

In modern vehicle systems, data from surround sensors are frequently recorded and forwarded to back end systems for evaluation. With respect to data that are obtained by means of the sensors of a park assist, the transmitted data can for example be raw data from ultrasonic sensors, information on recognized objects from combined ultrasound data, or information on recognized parking spaces. Such information is in particular of interest in a server-supported search for a parking space.

For example, DE 10 2012 218 334 A1 describes a method for finding a parking space for a vehicle in a target area. Connection data with several data servers assigned to the target area are saved in a connection server. Data on at least one parking space are saved in the data servers. In a first step, a search request for finding a parking space in the target area is sent to the connection server. Subsequently, the connection server establishes a connection with the data servers using the assignment data and, in doing so, asks whether availability data on available parking spaces in the target area are saved in the respective database. If availability data exist, initial feedback data are transmitted to the connection server by the respective data servers. Based on the initial feedback data, a decision is made in the connection server as to which of the respective data servers will be preselected. Then at least one data server is selected from the preselected data servers as the selection server. In a second query step, second feedback data on the selection server are retrieved which are more detailed than the respective initial feedback data, at least with regard to the parking space location.

Frequently, the variety of data that must be transmitted by the motor vehicle to the back end is problematic. If for example a measurement must be performed every 25 ms that ascertains a distance point with a 10 bit resolution, this yields a data rate of 400 bits per second.

SUMMARY

An object thus exists to present solutions for processing data in a motor vehicle to be forwarded to a back end that enable a reduction of the amount of data to be transmitted.

This object is achieved by a method with the features of the independent method claim and by a device with the features of the independent apparatus claim. Embodiments of the invention are the discussed in the dependent claims and the following description.

DETAILED DESCRIPTION

In a first exemplary aspect, a method for processing data in a motor vehicle to be forwarded to a back end comprises the steps:

Detecting sensor data along a route of the motor vehicle;

Identifying features and context information on the features within segments of the route using the sensor data; and Combining the features and the context information on the features into a message for the route.

In another exemplary aspect, a computer-readable storage medium contains instructions that, when executed by a computer, cause the computer to execute the following steps for processing data in a motor vehicle to be forwarded to a back end:

detecting sensor data along a route of the motor vehicle;
   identifying features and context information on the features within segments of the route using the sensor data; and
   combining the features and the context information on the features into a message for the route.

The term "computer" is to be interpreted broadly. For example, it also comprises control units and other processor-based data processing devices.

In another exemplary aspect, a device for processing data in a motor vehicle to be forwarded to a back end has:

an input for receiving sensor data detected along a route of the motor vehicle;
   an analysis unit for identifying features and context information on the features within segments of the route using the sensor data; and
   a data processing unit for combining the features and the context information on the features into a message for the route.

According to the teachings herein, a data profile ascertained by a vehicle is first divided into individual routes, i.e., sections. At least one message should be generated for each section. To reduce the amount of data, each section is then divided into segments, for example into eight segments, wherein one feature and if applicable one piece of context information on the feature is ascertained for each segment. Expressed otherwise, an abstraction of the data profile is carried out. The data reduced in this matter are combined into one data block per section, i.e., into a message. The resulting message may, e.g., be transferred to the back end. By processing the data accordingly, the desired forwarding of the data to the back end may be realized with a much smaller data volume.

Another benefit is that a potential loss of data only leads to a local failure of data but does not damage the entire data set. If a faulty data transmission is recognized, for example using one or more checksums provided according to a communication protocol for identifying defective parts of data, only the measurements from the associated time interval are lost. The measurements before and after the measurement are however retained and may be evaluated.

In one embodiment, the sensor data comprise a distance profile that is ascertained by distance sensors of the motor vehicle. The use of the solutions presented herein for the distance profile is particularly beneficial since no essential information is lost in the process. By abstracting the distance data with respect to the features and context information instead of directly transmitting the measured distances, the arising data volumes of originally 400 bits per second may be reduced to about 60 bits per second.

In another embodiment, the features describe the presence of objects along the route. In particular, the specific measured distances only play a minor role in detecting parking spaces. Of much greater interest is the question as to whether or not parking spaces for vehicles are occupied, or respectively whether any existing spaces between individual vehicles are actual parking spaces. Such questions may be easily resolved using the information on the presence of objects.

In another embodiment, the features comprise one or more of the following elements: object with constant distance, object with variable distance, free area, beginning of an object, end of an object, beginning of a recognized low object, end of a recognized low object, no data. These features are sufficient for a nearly complete description of the distance profile with respect to the described use; consequently, only a minimum amount of data is transferred.

In another embodiment, the context information on the features describes distances determined perpendicular to the route between the motor vehicle and a recognized object, or distances determined parallel to the route between a segment boundary and the beginning or end of an object. This context information also makes it possible for the back end to determine the specific dimensions of parking spaces. In this manner, the drivers of other vehicles may be assisted in a more targeted manner in the search for a parking space. In particular, it may thus be checked whether a parking space is sufficiently large for a given vehicle before this vehicle is guided into the parking space.

In another embodiment, the distances determined perpendicular to the route are indicated in percent with reference to a maximum detectable distance, and the distances determined parallel to the route are indicated in percent with reference to the length of a segment. By using percentages, it can be ensured that a desired number of bits is sufficient for coding the context information, independent of the size of the segments or the measuring range.

In another embodiment, the route is determined by a distance traveled over a given time interval. The time interval may, e.g., be 1 second so that the messages are generated at 1 Hz independent of the speed of the vehicle.

In some embodiments, a method according to embodiments of the invention or a device according to embodiments of the invention is used in a vehicle, e.g., a motor vehicle.

Further features of the present invention will become apparent from the following description and the appended claims in conjunction with the drawings.

In order to better understand the principles of the present invention, some embodiments are explained in greater detail below based on the FIGS. It should be understood that the invention is not limited to these embodiments and that the features described may also be combined or modified without departing from the scope of protection of the invention as defined in the appended claims.

Figure 1:
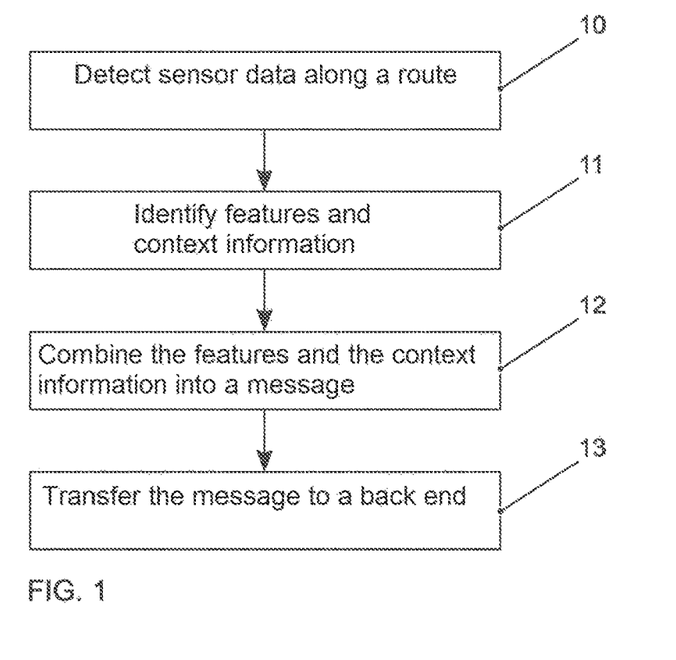
FIG. 1 schematically shows a method for processing data in a motor vehicle for forwarding to a back end.

FIG. 1 schematically shows a method for processing data in a motor vehicle for forwarding to a back end. In a first step, sensor data are detected along a route of the motor vehicle 10. The sensor data may for example be a distance profile that is ascertained by distance sensors of the motor vehicle. On the basis of the sensor data, features and context information on the features are then identified within segments of the route 11. The features may for example describe the presence of objects along the route. The context information on the features describes distances determined perpendicular to the route between the motor vehicle and a recognized object, or distances determined parallel to the route between a segment boundary and the beginning or end of an object. Finally, the features and the context information on the features are combined into a message for the route 12. The resulting message is then transferred to the back end 13. The route may for example be determined by a distance traveled over a given time interval, i.e., the messages are generated in a given cycle independent of the speed of the motor vehicle.

Figure 2:
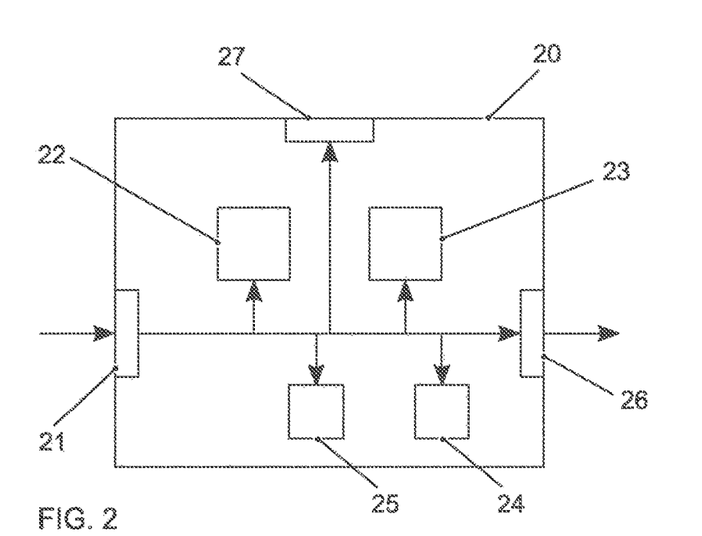
FIG. 2 shows a first embodiment of a device for processing data in a motor vehicle for forwarding to a back end.

FIG. 2 shows a simplified schematic representation of a first embodiment of a device 20 for processing data in a motor vehicle for forwarding to a back end. The device 20 has an input 21 via which sensor data detected along a route of the motor vehicle may be received. The sensor data may of course also originate from sensors that are part of the device 20. The sensor data may for example be a distance profile that is ascertained by distance sensors of the motor vehicle. Moreover, the device 20 has an analysis unit 22 for identifying features and context information on the features within segments of the route using the sensor data. The features may for example describe the presence of objects along the route. The context information on the features describe distances determined perpendicular to the route between the motor vehicle and a recognized object, or distances determined parallel to the route between a segment boundary and the beginning or end of an object. The route may for example be determined by a distance traveled over a given time interval. A data processing unit 23 combines the features and the context information on the features into a message for the route. The analysis unit 22 and the data processing unit 23 may be controlled by a control unit 24. If applicable, settings of the analysis unit 22, the data processing unit 23 or the control unit 24 may be changed by means of a user interface 27. The data accumulating in the device 20, such as generated messages or other data generated by the analysis unit 22 or the data processing unit 23, may be filed in a memory 25 of the device 20, for example for later evaluation, or for use by the components of the device 20. In particular, the generated messages may also be output by an output 26 of the device 20. The analysis unit 22, the data processing unit 23 and the control unit 24 may be realized as dedicated hardware, for example as integrated circuits. Of course, they may, however, also be partially or completely combined or implemented as software that runs on a suitable processor such as a GPU. The input 21 and output 26 may be implemented as separate interfaces or as a combined bidirectional interface.

Figure 3:
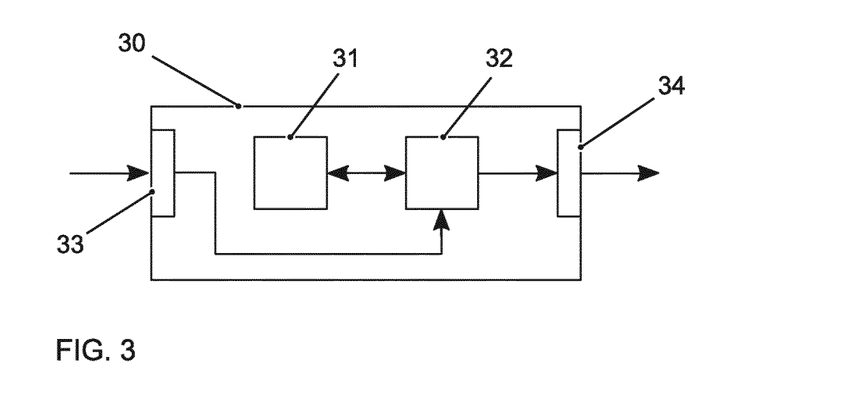
FIG. 3 shows a second embodiment of a device for processing data in a motor vehicle for forwarding to a back end.

FIG. 3 shows a simplified schematic representation of a second embodiment of a device 30 for processing data in a motor vehicle for forwarding to a back end. The device 30 has a processor 32 and a memory 31. For example, the device 30 is a computer or control unit. Instructions are saved in the memory 31 that, when executed by the processor 32, cause the device 30 to execute the steps according to one of the described methods. The instructions saved in the memory 31 thus represent a program that may be run by the processor 32 and that implements a method according to the teachings herein. The device 30 has an input 33 for receiving information such as sensor data. Data generated by the processor 32 is made available via an output 34. Moreover, said data may be saved in the memory 31. The input 33 and the output 34 may be combined into a bidirectional interface.

The processor 32 may comprise one or more processor units, for example microprocessors, digital signal processors or combinations thereof.

The memories 25, 31 of the described embodiments may have volatile as well as non-volatile memory areas and may comprise a wide range of memory units and storage media, such as hard disks, optical storage media or semiconductor memories.

Figure 4:
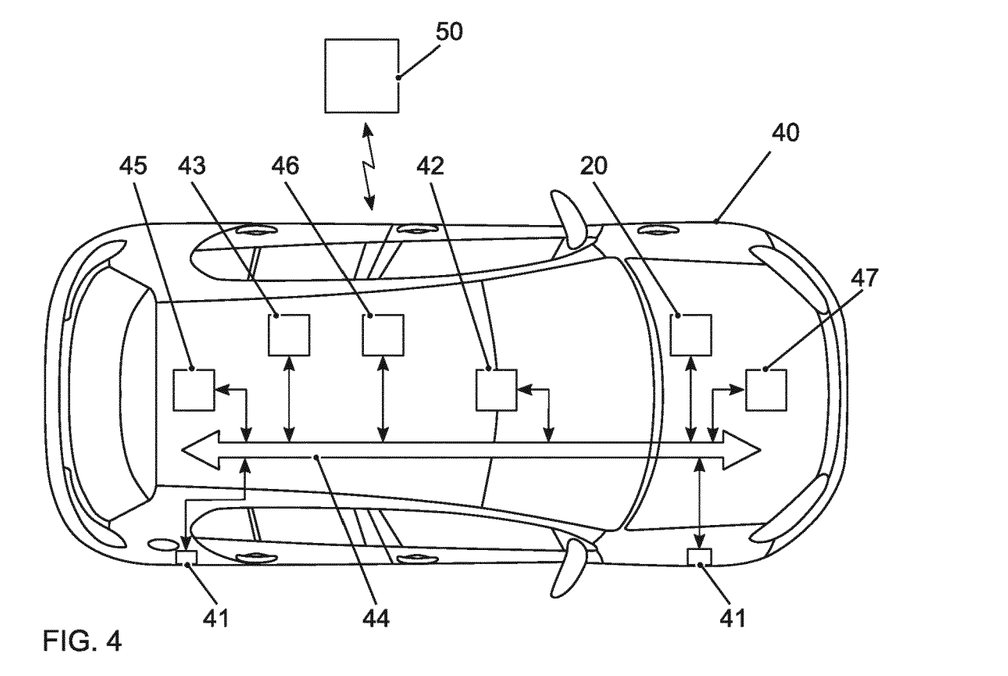
FIG. 4 schematically shows a motor vehicle in which an embodiment is realized.

FIG. 4 schematically shows a motor vehicle 40 in which a solution according to the present teachings is realized. The motor vehicle 40 has, inter alia, ultrasonic sensors 41, of which for example two are represented on the right side of the vehicle, and by means of which a distance profile is ascertained. The distance profile is for example used by a park assist 47. Other data may be detected by a surround sensor system 42, such as a camera or radar system, as well as a navigation system 43. The detected data are transferred through a network 44 to a device 20 for processing data for forwarding to a back end 50. The data generated by the device 20 may be filed in a memory 45 of the motor vehicle 40. They may also be transferred by means of a data transmission unit 46 to the back end 50.

In the following, some embodiments will be described with reference to FIGS. 5 to 9. In these embodiments, the sensor data are distance data that are ascertained by means of the ultrasonic sensors of a park assist. Of course, other sensor data may also be processed such as data on the road surface or on the traffic flow. The context information may be adapted in this case to the respective ascertained data.

Figure 5:
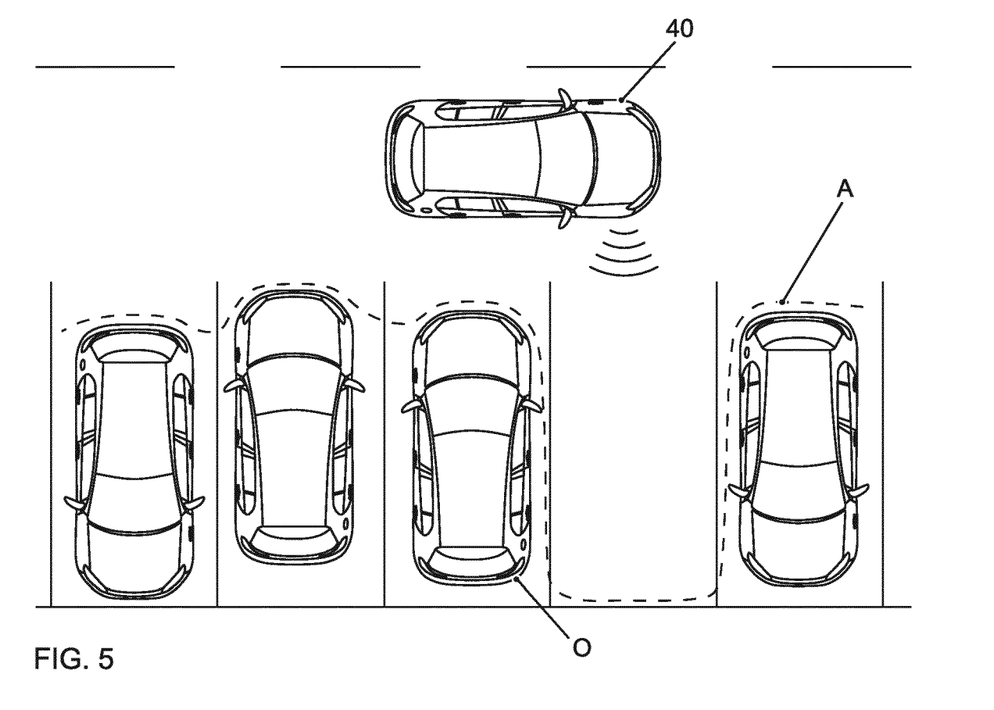
FIG. 5 shows an exemplary ultrasonic measurement with an ascertained distance profile.

FIG. 5 shows an exemplary ultrasonic measurement with an ascertained distance profile A. The distance measurement of the lateral ultrasonic sensors on the motor vehicle 40 is assumed. These measure the distance to potential objects O in the near range perpendicular to the direction of travel. In this case, the distances are always ascertained by means of a runtime measurement of an ultrasonic signal, wherein normally the time between the transmission pulse and the echo is measured within a time interval. If an echo is not received within the time interval, a free area is assumed. This measurement is used in current vehicles for example to measure parking spaces. In doing so, the vehicle drives past the parked vehicles and performs a measurement of distance at short distances. In combination with the known vehicle movements, the distances are combined at the correct position so that a distance profile or distance scan A results. Free parking spaces may be ascertained from the distance profile A. The distance profile A may also be used to plan parking maneuvers. For future uses, it is desirable to forward this distance profile to back end services. The back end services forward the distance profiles to known roadmaps and ascertain the currently available parking spaces from the distance profiles in combination with additional map data. The resulting information may be forwarded to other vehicles and help drivers in the parking space search.

Figure 6:
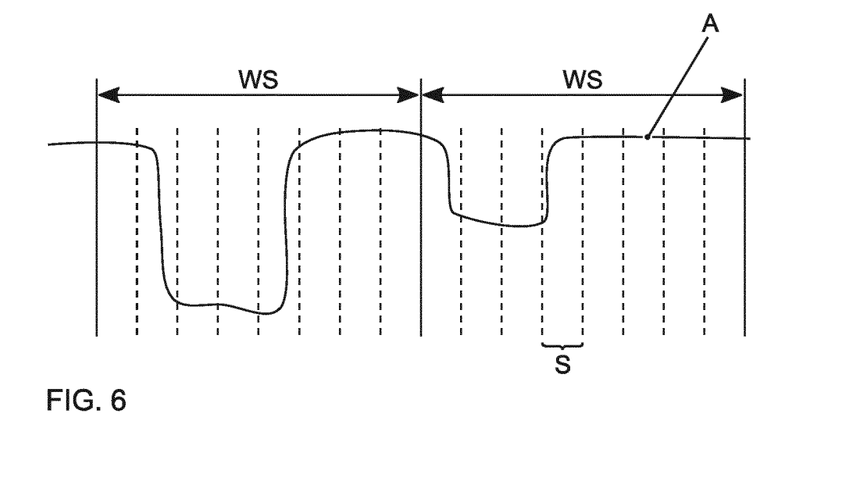
FIG. 6 shows an example of dividing up a traveled distance into individual routes traveled over a given time interval with subsequent segmentation.

FIG. 6 shows an example of dividing up a traveled distance into individual routes traveled over a given time interval with subsequent segmentation. To accomplish this, the distance scan is divided into a series of routes, or respectively sections WS that were each traveled over a specific time by the vehicle during the measurement. In the example, the sections WS were traveled by the vehicle over a second. Each section WS is divided into eight segments S in the shown example. One message is generated for each section WS, i.e., the messages are sent at 1 Hz independent of the speed of the vehicle. Stated otherwise, at a speed of 20 m/s, the message describes a measurement over 20 m; at a speed of for example 5 m/s, the message only describes a measurement over 5 m, however with a higher spatial resolution.

Figure 7:
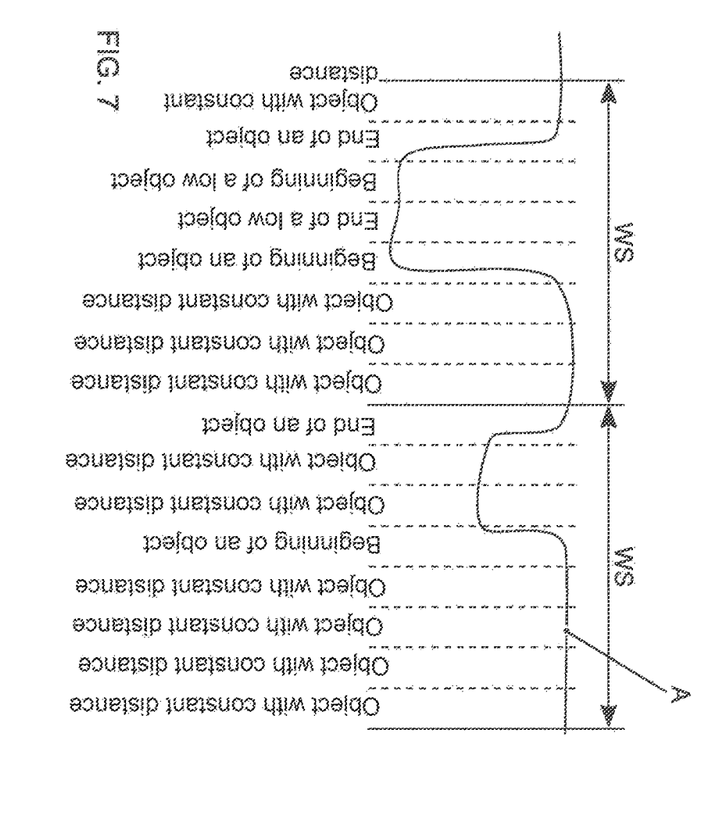
FIG. 7 shows an example of recognized features per segment of a first embodiment.

Features are searched for within the segments S. According to a first embodiment, these features may comprise the following elements:
  object with constant distance
  object with variable distance
  free area
  beginning of an object
  end of an object
  beginning of a recognized low object
  end of a recognized low object
  no data FIG. 7 shows an example of the feature recognized using the sensor data for each segment from FIG. 6. Low objects such as curbs may if applicable be recognized by using additional data if this is impossible from the sensor data of the ultrasonic sensors. The recognized features are classified with an ID and at least partially enriched with context information.

Figure 8:
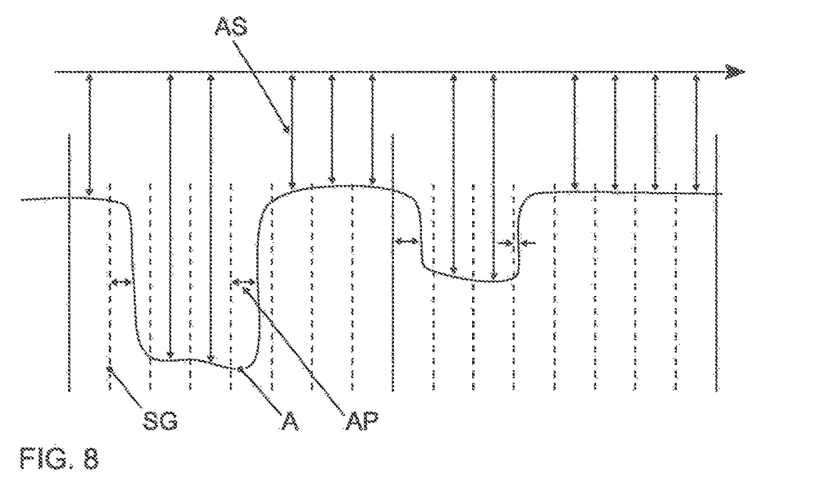
FIG. 8 shows an example of context information per segment of the first embodiment.

Possible context information is shown in FIG. 8. In the event of jumps in the measured distance that normally result from the beginning or the end of an object, the context information consists of the distance AP between the previous segment boundary SG and the beginning, or respectively the end, of the object parallel to the vehicle movement. If the measured distance does not have any jumps, i.e., when the distance to an object is basically constant, the context information consists of the distance AS measured perpendicular to the vehicle movement between the motor vehicle and the object.

The information is coded in two variables, an ID with two bits, i.e., the value range 0-3, and a context with five bits, i.e., the value range 0-31. In order to describe all the features with the variables, the ID and the values 30 and 31 of the context are used. The value range 0-29 of the context is used for coding the measured values as context information. For example, the following coding table may be used for coding:

|  |  | ID | | | |
| --- | --- | --- | --- | --- | --- |
| Context | | 0 | 1 | 2 | 3 |
| Measured values | 0 ... 29 | end of an object | beginning of an object | object with constant distance | object with variable distance |
| Logical values | 30 | free area | void | end of a recognized low object | void |
|  | 31 | beginning of a recognized low object | void | no data | void |

In this case for example ID=0 and context=30 are assigned for a "free area", whereas ID=2 and context=31 are assigned for missing data.

The following logic may be employed for the use of the ID and context, wherein the conditions and the values of the ID and context are always indicated for each feature:

Feature: Free area

Condition: No echo was received in the segment.

ID: 0

Context: 30

Feature: No data

Condition: There was no measurement within the segment.

ID: 2

Context: 31

Feature: End of an object

Condition: The gradient of two adjacent individual measurements within a segment has a negative sign, and the amount of this gradient is greater than 1 m.

ID: 0

Context: Percent position of the greatest gradient in the segment along the direction of travel (position/length of the segment).

Feature: Beginning of an object

Condition: The gradient of two adjacent individual measurements within a segment has a positive sign, and the amount of this gradient is greater than 1 m.

ID: 1

Context: Percent position of the greatest gradient in the segment along the direction of travel (position/length of the segment).

Feature: Object with constant distance

Condition: The sum of all gradients within a segment is less than 1 m.

ID: 2

Context: Percent distance between the object and the vehicle perpendicular to the direction of travel (distance/maximum detectable distance). In this case, the smallest distance is to be chosen.

Feature: Object with variable distance

Condition: The sum of all gradients in a segment is greater than or equal to 1 m, and no individual gradient in this segment is greater than or equal to 1 m.

ID: 3

Context: Percent distance between the object and the vehicle perpendicular to the direction of travel (distance/maximum detectable distance). In this case, the smallest distance is to be chosen.

Feature: Beginning of a recognized low object

Condition: The first value in the segment is not a "recognized low object", and the last value in the segment is a "recognized low object".

ID: 0

Context: 31

Feature: End of a recognized low object

Condition: The first value in the segment is a "recognized low object", and the last value in the segment is not a "recognized low object".

ID: 2

Context: 30

In the event that different features occur at the same time in a segment, a prioritization may appear as follows, wherein the prerequisites and the results are each indicated:

First feature: Beginning of an object or end of an object

Second feature: Beginning of a recognized low object, or end of a recognized low object Resulting feature: Beginning of a recognized low object, or end of a recognized low object Note: A recognized low object is always prioritized higher than the beginning and end of an object First feature: Object with constant distance, or object with variable distance Second feature: Beginning of a recognized low object, or end of a recognized low object Resulting feature: Beginning of a recognized low object, or end of a recognized low object Note: A recognized low object is always prioritized higher than an object status If several features occur sequentially in a segment, then the more recent feature should always be output.

Finally, the ascertained data are summarized, for example in separate messages for the left and the right side of the vehicle. CAN messages (CAN: controller area network) may be used for this, for example.

An exemplary message PLA_SDA_01 for the left side of the vehicle may be constructed as follows:

PLA_SDA_Le_ID_1
PLA_SDA_Le_context_1
PLA_SDA_Le_ID_2
PLA_SDA_Le_context_2
PLA_SDA_Le_ID_3
PLA_SDA_Le_context_3
PLA_SDA_Le_ID_4
PLA_SDA_Le_context_4

PLA_SDA_Le_ID_5
PLA_SDA_Le_context_5
PLA_SDA_Le_ID_6
PLA_SDA_Le_context_6
PLA_SDA_Le_ID_7
PLA_SDA_Le_context_7
PLA_SDA_Le_ID_8
PLA_SDA_Le_context_8

In the message, simply the ID and the context values for the respective segments are listed sequentially. In another message PLA_SDA_02, the right side of the vehicle may be transmitted. Accordingly, a statistical record is available for transmitting the data via the bus system of the vehicle.

In a second embodiment, the features may comprise the following elements:

No object

Object parallel to the direction of travel (vehicle parked parallel to the road, ±20 degrees tolerance)

Object perpendicular to the direction of travel (vehicle parked perpendicular to the road, ±20 degrees tolerance)

Other object (vehicle parked at an angle and other objects)

Curb

Continuation of an object (continuation of an object from the previous segment to the extent that a new object does not begin in the current segment)

Figure 9:
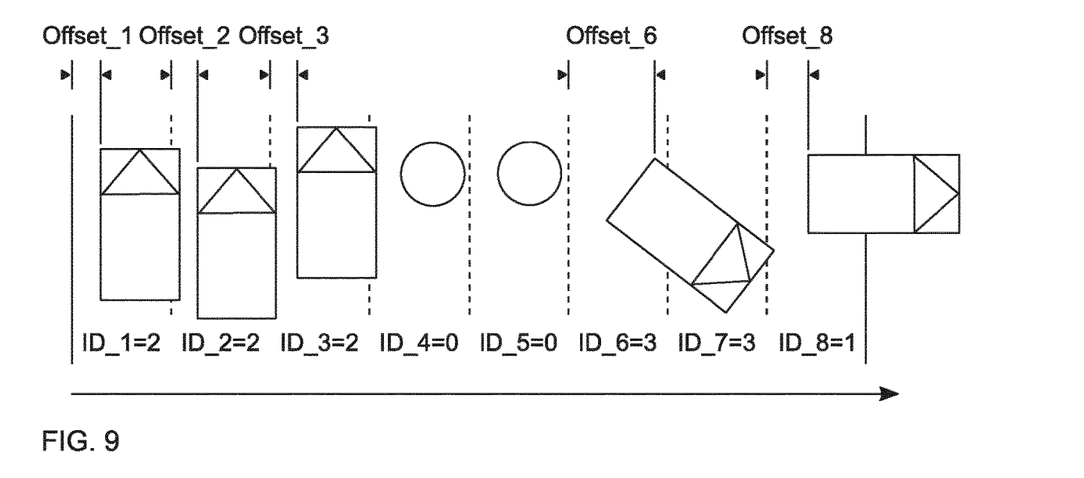
FIG. 9 schematically shows the content of a message corresponding to a second embodiment.

In this embodiment, potential recognized objects are classified into groups and are defined with regard to their distance to the segment boundary. The context information therefore consists only of the distances to the segment boundaries. The content of a message corresponding to this embodiment is schematically shown in FIG. 9. The size of the segments may for example be configured so that a segment never contains more than one relevant object. Accordingly it can be achieved that, because of the data format, no elements are lost.

The associated structure may then, for example, appear as follows (formulated for example in the "protocol buffers" data format):

```
message Parking_Scan_Left
{
    required int64 timeStampUTC_ms = 1;
    required ParkingUssScanData parkingData = 2;
}
message Parking_Scan_Right
{
    required int64 timeStampUTC_ms = 1;
    required ParkingUssScanData parkingData = 2;
}
message ParkingUssScanData
{
    enum ParkSegmentStateEnum
    {
        NO_OBJECT_DETECTED = 0; //(no object)
        LONGITUDINAL_OBJECT = 1; //(object parallel to the
direction of travel)
        VERTICAL_OBJECT = 2; //(object perpendicular to the
direction of travel)
        ANY_OBJECT = 3; //(other object)
        CURBSTONES = 4; //(curb)
        OBJECT_CONTINUED = 5; //(continuation of an object)
    }
    required ParkSegmentStateEnum_ID_1 = 1;
    required uint32 offset_1 = 2;
    required ParkSegmentStateEnum_ID_2 = 3;
    required uint32 offset_2 = 4;
    required ParkSegmentStateEnum_ID_3 = 5;
    required uint32 offset_3 = 6;
    required ParkSegmentStateEnum_ID_4 = 7;
    required uint32 offset_4 = 8;
```

-continued

```
        required ParkSegmentStateEnum_ID_5 = 9;
        required uint32 offset_5 = 10;
        required ParkSegmentStateEnum_ID_6 = 11;
        required uint32 offset_6 = 12;
        required ParkSegmentStateEnum_ID_7 = 13;
        required uint32 offset_7 = 14;
        required ParkSegmentStateEnum_ID_8 = 15;
        required uint32 offset_8 = 16;
}
```

The data transmitted to the back end may be complemented with additional information from the vehicle such as a timestamp, GPS position data, camera lane data, or the speed. These data are already used for other functions so that no additional costs arise for acquiring this information.

With the assistance of the speed, the segments in the back end may be combined into the original distance profile in the correct time sequence according to the timestamps. These may then be placed at the associated map position by means of the GPS position.

The generation of the messages may be restricted to a certain speed range. This may allow for example suppression of the forwarding of messages while stationary or at higher speeds when reliable measurement by the parking system no longer exists.

Another benefit of the described data processing is that the protocol may be reduced during further processing. This may for example be implemented by omitting features.

In the simplest case, all feature data that characterize a free area may be removed in another step. If the vehicle is for example moving on a two-lane road, a free vehicle lane is located on one side of the vehicle. This may be directly recognized by evaluating the features and excluded from a transmission to the back end.

In another version, all of the features except for the start and end of an object are excluded from the transmission. Analogous to the previous example, this is possible by simply filtering the data according to features.

LIST OF REFERENCE NUMERALS

10 Detect sensor data along a route
11 Identify features and context information
12 Combine the features and the context information into a message
13 Transfer the message to a back end
20 Device
21 Input
22 Analysis unit
23 Data processing unit
24 Control unit
25 Memory
26 Output
27 User interface
30 Device
31 Memory
32 Processor
33 Input
34 Output
40 Motor vehicle
41 Ultrasonic sensors
42 Surround sensor system
43 Navigation system
44 Network
45 Memory
46 Data transmission unit 47 Park assist
50 Back end
A Distance profile
AP Distance of an object from a segment boundary
AS Distance of an object from a vehicle
Object
S Segment
SG Segment boundary
WS Route The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for processing route-related data in a motor vehicle for a route of the motor vehicle, comprising:
   detecting sensor data along the route of the motor vehicle, wherein the route is determined by a distance traveled over a given time interval;
   identifying features within segments of the route using the sensor data, wherein the features comprise objects along the route;
   classifying the identified features;
   determining context information for the identified features using the sensor data, wherein determining context information comprises at least determining a distance between the vehicle and an object perpendicular to the route or determining a distance parallel to the route between a segment boundary and the beginning or end of an object; and
   combining the identified features and the context information on the features into an electronic message, which message describes the arrangement of the detected objects along at least a segment of the route.

2. The method of claim 1, comprising:
   transferring the message to the back end.

3. The method of claim 1, wherein the sensor data comprise a distance profile that is ascertained by distance sensors of the motor vehicle.

4. The method of claim 1, wherein the features comprise one or more of the following elements: object with constant distance, object with variable distance, free area, beginning of an object, end of an object, beginning of a recognized low object, end of a recognized low object, no data.

5. The method of claim 1, wherein the distances determined perpendicular to the route are indicated in percent with reference to a maximum detectable distance, and the distances determined parallel to the route are indicated in percent with reference to the length of a segment.

6. The method of claim 1, wherein the route is divided into eight segments.

7. A non-transitory computer-readable storage medium with instructions that, when executed by a computer, cause the computer to execute the steps of the method of claim 1 for processing data in a motor vehicle for forwarding to a back end.

8. A motor vehicle, configured to execute the method of claim 1 for processing data for forwarding to a back end.

9. A device for processing route-related data in a motor vehicle for a route of the motor vehicle, comprising:
   an input, connected with one or more sensors for receiving sensor data detected along the route of the motor vehicle, wherein the route is determined by a distance traveled over a given time interval;
   an analysis circuit, connected with the input to receive the sensor data, the analysis circuit being configured for:
   identifying features within segments of the route using the sensor data, wherein the features comprise objects along the route;
   classifying the identified features; and
   determining context information for the identified features using the sensor data, wherein determining context information comprises at least determining a distance between the vehicle and an object perpendicular to the route or determining a distance parallel to the route between a segment boundary and the beginning or end of an object; and
   a data processing circuit, connected with the analysis circuit, for combining the identified features and the context information on the features into an electronic message, which message describes the arrangement of the detected objects along at least a segment of the route.

10. A motor vehicle with the device of claim 9.

11. The method of claim 2, wherein the sensor data comprise a distance profile that is ascertained by distance sensors of the motor vehicle.

* * * * *